Jan. 7, 1958 W. F. BAILEY 2,819,333

COLOR-TELEVISION PROJECTION SYSTEM

Filed May 24, 1954

2,819,333
Patented Jan. 7, 1958

2,819,333

COLOR-TELEVISION PROJECTION SYSTEM

William F. Bailey, Valley Stream, N. Y., assignor to Hazeltine Research, Inc., Chicago, Ill., a corporation of Illinois Application May 24, 1954, Serial No. 431,775

2 Claims. (Cl. 178—5.4)

Figure 1:
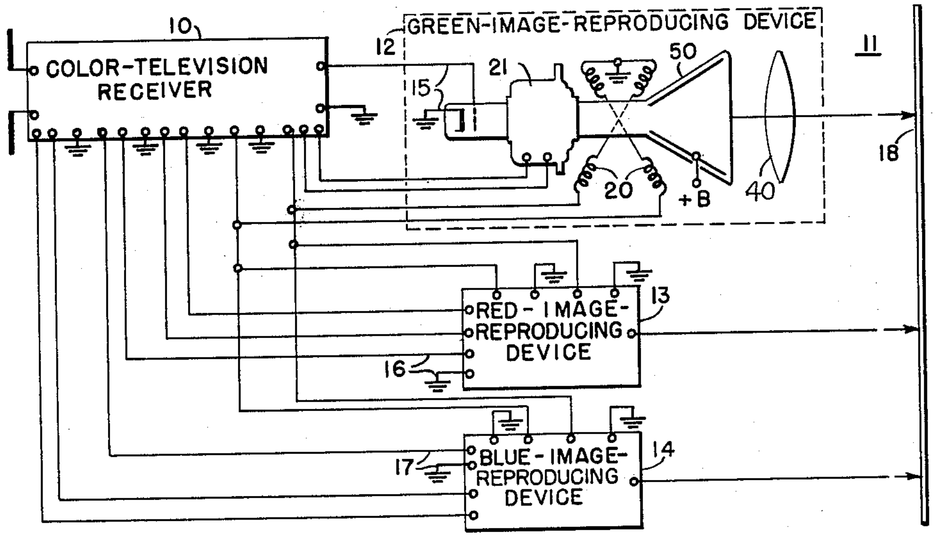

This invention relates to color-television projection systems and to electromagnetic beam focus-winding structures therefor.

In color-television projection systems, it is extremely important that component color images projected to a display screen be maintained in exact register to reproduce a composite color image. In projection systems utilizing electromagnetic beam focus windings associated with cathode-ray tubes, the image register may be degraded by temperature variations of the apparatus which cause motion of a beam focus-winding structure as a whole with respect to a cathode-ray tube in a manner more fully described in applicant's copending application, Serial No. 429,941, filed May 14, 1954, and entitled "Color Image-Reproducing Apparatus of the Projection Type." Moreover, applicant believes it was not heretofore appreciated that expansion of the beam focus winding within its housing could cause a deformation of the housing which would degrade the image register.

It is an object of the present invention, therefore, to provide a new and improved color-television projection system in which misregistration of the component projected images due to temperature variations of the apparatus is minimized.

In accordance with a particular form of the invention, a color-television projection system comprises circuit means for supplying signals representative of predetermined primary images of a composite color image to be reproduced and a display screen. The system also includes cathode-ray image-reproducing devices responsive to the signals for projecting images on the display screen in register and each including a ferromagnetic focus-winding housing, an electromagnetic focus winding clamped therein, and resilient means disposed between the winding and the housing for allowing longitudinal thermal expansion of the winding without deformation of the housing by the winding to minimize misregistration of the projected images due to temperature variations of the apparatus.

For a better understanding of the present invention, together with other and further objects thereof, reference is had to the following description taken in connection with the accompanying drawing, and its scope will be pointed out in the appended claims.

Figure 2:
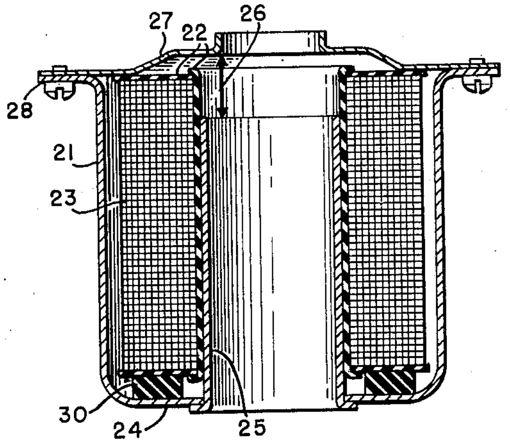

Referring to the drawing:

Fig. 1 is a diagram, partly schematic, of a color-television receiver including a projection system constructed in accordance with the invention, and Fig. 2 is a cross-sectional view of an electromagnetic beam focus-winding structure constructed in accordance with the invention.

Referring now more particularly to Fig. 1 of the drawing, there is represented a color-television receiver 10 including conventional receiver circuits of a type more fully described in applicant's aforesaid copending application. There is associated with the receiver 10 a color-television projection system 11 including circuit means for supplying signals representative of predetermined primary images of a composite color image to be reproduced. More particularly, this circuit means comprises, for example, three input circuits of green, red, and blue image-reproducing devices 12, 13, 14, respectively. In particular, input circuits 15, 16, and 17, supply red, green, and blue video-frequency signals to control electrodes and cathodes of three cathode-ray image-reproducing tubes for developing, in conjunction with suitable light filters (not shown), green, red, and blue color images for projection to a display screen 18 in register.

The cathode-ray tube 50 of the green image-reproducing device 12 has the usual electrodes and beam-deflection windings 20 for causing the cathode-ray beam of the tube to scan the face thereof in a conventional manner. The device 12 also includes an electromagnetic beam focus-winding structure 21 constructed in accordance with the invention and more fully described hereinafter. There is also provided a suitable lens or other optical system represented, for purposes of explanation, by converging lens 40. Units 13 and 14 preferably are of similar construction to unit 12 with the exceptions that they include red and blue image-reproducing cathode-ray tubes, respectively.

Referring now more particularly to Fig. 2, the electromagnetic beam focus-winding structure 21 of the Fig. 1 system preferably comprises a fiber bobbin 22 and an electromagnetic beam focus-winding 23 around the bobbin. The winding structure also includes a ferromagnetic metallic housing 24 having a central inner tube 25 for disposition of a cathode-ray tube therein and for forming an air gap 26 within the housing in conjunction with an end plate 27 for clamping the bobbin 22 and the winding 23 within the housing. The end plate may be attached by suitable screws to the housing which preferably is slightly larger axially than the winding 23 to provide space for resilient means disposed between an end of the winding 23 and the housing 24 for allowing longitudinal thermal expansion of the winding without deformation of the housing by the winding. More particularly, the resilient means may comprise, for example, a rubber washer 30 of suitable thickness, or rubber strips, preferably attached to the bobbin at the end away from the air gap so that the relation of the winding to the gap is maintained substantially constant regardless of winding expansion.

Because of the firm but resilient mounting of the winding within the housing, the winding can expand with temperature rises without deforming the housing. Any transverse deformation of the housing which might be caused by a tilting of the winding 23 within the housing and a consequent stress upon the central tube 25 is thereby eliminated. Transverse deformation of the housing is particularly objectionable because it results in a deformation of the air gap 26 altering the magnetic field across the gap. Such an alteration of the magnetic field shifts the image raster projected by a cathode-ray tube and results in misregistration of component color images projected to the display screen.

From the foregoing description, it will be apparent that misregistration of the projected images due to temperature variations of the apparatus is minimized.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A color-television projection system comprising: circuit means for supplying signals representative of predetermined primary images of a composite color image to be reproduced; a display screen; and cathode-ray image-reproducing devices responsive to said signals for projecting images on said display screen in register and each including a ferromagnetic focus-winding housing, an electromagnetic focus winding clamped therein, and resilient means disposed between said winding and said housing for allowing longitudinal thermal expansion of said winding without deformation of said housing by said winding to minimize misregistration of said projected images due to temperature variations of the apparatus.

2. A color-television projection system comprising: circuit means for supplying signals representative of predetermined primary images of a composite color image to be reproduced; a display screen; and cathode-ray image-reproducing tubes responsive to said signals and associated means for projecting images on said display screen in register and each tube having a ferromagnetic focus-winding housing having a central inner tube for disposition of the cathode-ray tube therein and for forming an air gap at one end of said housing, an electromagnetic focus-winding clamped therein, and resilient means disposed between the other end of said housing and said winding for allowing longitudinal thermal expansion of said winding without transverse deformation of said housing and said air gap by said winding to minimize misregistration of said projected images due to temperature variations of the apparatus.

References Cited in the file of this patent

UNITED STATES PATENTS

| | | |
|---|---|---|
| 2,501,516 | Holden | Mar. 21, 1950 |
| 2,648,036 | Walton | Aug. 4, 1953 |
| 2,743,308 | Bardsley | Apr. 24, 1956 |

FOREIGN PATENTS

| | | |
|---|---|---|
| 174,545 | Canada | Jan. 16, 1917 |